Patented Oct. 16, 1923.

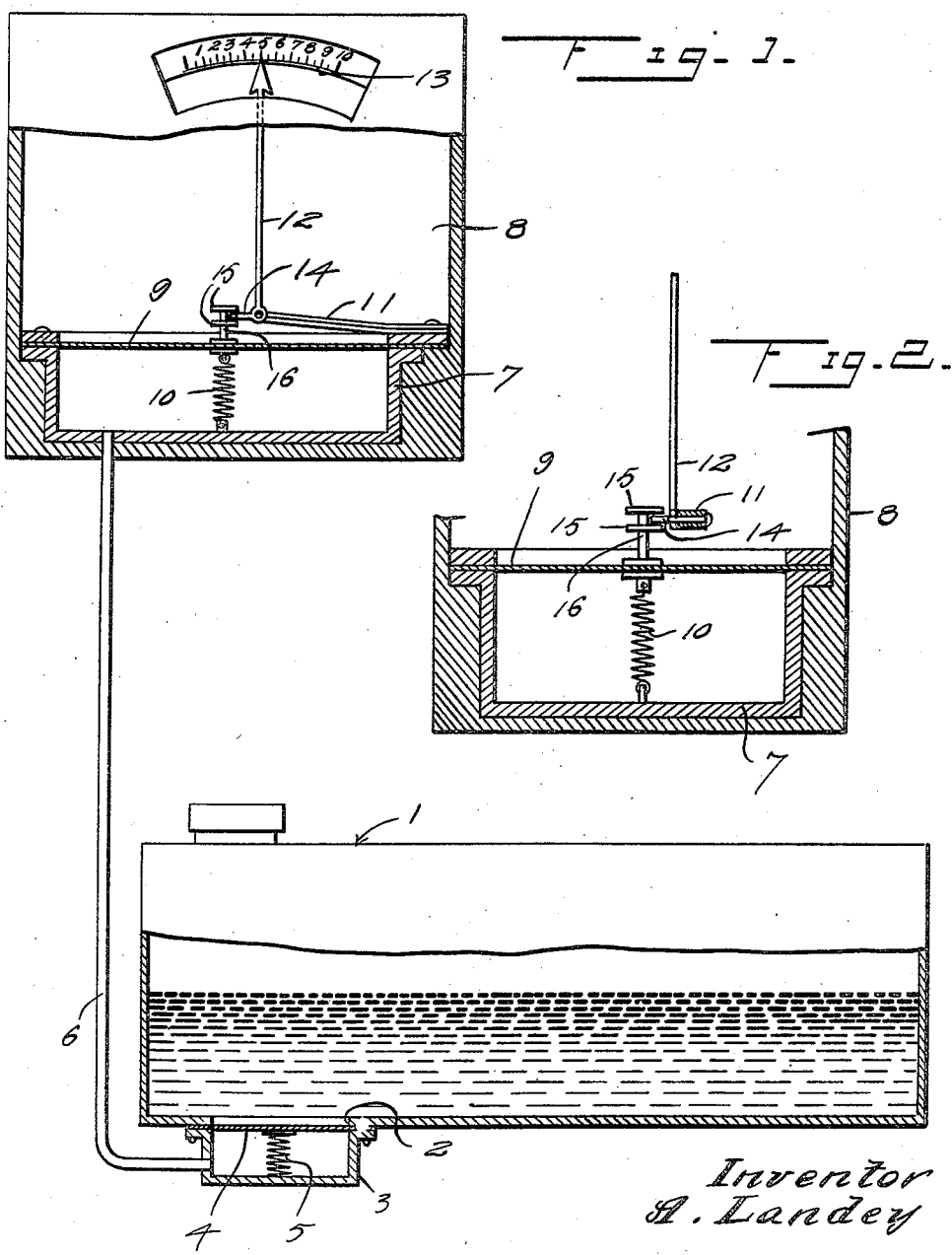

1,471,174

UNITED STATES PATENT OFFICE.

ARNEY LANDEY, OF GRAND RAPIDS, MINNESOTA.

PRESSURE GAUGE.

Application filed July 11, 1919. Serial No. 310,015.

*To all whom it may concern:*

Be it known that I, ARNEY LANDEY, a citizen of the United States, residing at Grand Rapids, in the county of Itasca and State of Minnesota, have invented certain new and useful Improvements in Pressure Gauges; and I do hereby declare the following to be a full, clear, and exact description of the invention, such as will enable others skilled in the art to which it appertains to make and use the same.

This invention relates to new and useful improvements in gauges for fuel tanks of automobiles so that the amount of fuel in the tank can be readily determined and has for one of its objects the provision of means for operating an indicator over a scale by the weight of fuel in the tank.

Another object of this invention is the provision of two diaphragms, one of which is connected to the indicator and the other actuated by the weight of the fuel so that on movement of the last named diaphragm, the first named diaphragm will be actuated to move the indicator over the scale.

A further object of this invention is the provision of thermostatic means for adjusting the pivotal point of the indicator according to atmospheric conditions so that the indicator will correctly operate in conjunction with the scale at all times.

A further object of this invention is the provision of a gasoline gauge for automobiles of the above stated character, which shall be simple, durable and efficient, and which may be manufactured and sold at a comparatively low cost.

With these and other objects in view as will become more apparent as the description proceeds, the invention consists in certain novel features of construction, combination, and arrangement of parts as will be hereinafter more fully described and claimed.

For a complete understanding of my invention, reference is to be had to the following description and accompanying drawing, in which:—

Figure 1 is a vertical sectional view of a gauge constructed in accordance with my invention, Figure 2 is a sectional view taken at right angles to the indicator shown in Figure 1.

Referring in detail to the drawing, the numeral 1 indicates the fuel tank of an automobile and adapted to be mounted on the automobile at any desired point and has formed in its bottom an opening 2 over which is secured a casing 3. A diaphragm 4 is interposed between the tank 1 and the casing 3 for the purpose of closing the opening 2 and so that the fuel within the tank rests upon the diaphragm. An expansion spring 5 is interposed between the diaphragm and the casing 3 for returning the diaphragm to its initial position as the weight of the fuel thereon decreases, owing to the fuel being consumed by the engine of the automobile from the tank. The casing 3 is hermetically sealed to the tank 1 in any well known manner and has connected thereto a pipe 6 which is connected to a casting 7. The casting 7 is confined within the casing 8 of any desired construction and which is preferably located on the instrument board of the automobile and in clear view of the operator. A diaphragm 9 closes the casting 7 and hermetically seals the same and has connected thereto a contractile spring 10 which is in turn connected to the casting 7, thus it will be seen that air will be confined within the casing 3 and the casting 7 when the casing and casting are sealed in which the air will transmit pressure from the casing to the casting and vice versa through the pipe 6. The spring 10 is adapted to pull on the diaphragm 9 or to move the same in the direction of the bottom wall of the casting when the weight of the fuel on the diaphragm 4 decreases and the pressure on the air within the casting is reduced.

A thermostat 11 is secured to the casting 7 and has an indicator 12 pivoted to its free end, said indicator being adapted to move over a scale 13. The indicator at its pivoted end has angular extensions 14 adapted to be disposed between spaced disks 15 secured to a pin 16 carried by the diaphragm 9, so that on movement of the diaphragm 9 in either direction, the indicator will be compelled to move over the scale in a corresponding direction, thus indicating the amount of fuel within the tank 1.

From the foregoing description taken in connection with the accompanying drawing, it will be noted that as the tank 1 is filled with fuel, the weight upon the diaphragm 4 is increased, thus causing said diaphragm to move in the direction of the bottom wall of the casing 3 against the tension of the spring compressing the air in the casing 3, the pipe 6 and the casting 7 which causes the diaphragm 9 to move outwardly, and on so doing causes the indicator to move over the scale indicating the amount of fuel within the tank. As the fuel is used from the tank 1 the weight of the fuel on the diaphragm 4 decreases permitting the spring 5 to move the diaphragm upwardly enlarging the space within the casing 3 so that some of the air within the casing 7 will be forced into the casing 3 by the spring 10 pulling on the diaphragm and which permits the diaphragm 9 to move inwardly moving the indicator in the direction of zero on the scale. The thermostat 11 is adapted to adjust the pivotal point of the indicator according to temperature conditions so that the indicator will be caused to register zero at all times when the tank 1 is empty regardless of the change in the temperature, which may affect the expansion and contraction of the diaphragms and the other parts.

The indicator 12 and scale 13 are coated with luminous paint so that they can be readily readable at night time.

While I have shown and described the preferred embodiment of my invention, it will be understood that minor changes in construction, combination, and arrangement of parts may be made without departing from the spirit and scope of the invention as claimed.

Having thus described my invention, what I claim is:—

1. A pressure gauge including an open-ended casing, a diaphragm secured to said casing and adapted to close said open end, a bimetallic member having one end secured to the casing and its free end positioned above one face of the diaphragm and adjacent the center thereof, a shaft journaled in the free end of the bimetallic member, a pointer rigidly secured to said shaft and provided with a lateral extension, means for transmitting movements of the diaphragm to said pointer through said lateral extension, said casing carrying a graduated scale cooperating with said pointer, and means for transmitting pressure to the other face of the diaphragm.

2. In a pressure gauge, an open-ended casing, a diaphragm secured to said casing and arranged to close said open end, a pointer, a shaft secured to the pointer, means adapted to position said pointer above one face of the diaphragm, said means comprising a bimetallic strip secured at one end to the casing and carrying bearing means at its free end adapted to receive said shaft, means connecting the pointer and diaphragm whereby flexing of the diaphragm will cause oscillation of the pointer, said casing carrying a scale cooperating with the pointer, and means for subjecting the other face of the diaphragm to a medium under pressure.

In testimony whereof I affix my signature in presence of two witnesses.

ARNEY LANDEY.

Witnesses:
 DORA E. SEAMAN,
 W. R. GIBERSON.